United States Patent
Wei et al.

(10) Patent No.: US 10,104,472 B2
(45) Date of Patent: Oct. 16, 2018

(54) ACOUSTIC CAPTURE DEVICES AND METHODS THEREOF

(71) Applicant: Fortemedia, Inc., Santa Clara, CA (US)

(72) Inventors: Qiang Wei, Santa Clara, CA (US); Lung-Chu Joseph Chen, Pleasanton, CA (US); Powen Ru, Santa Clara, CA (US); Qing-Guang Liu, Sunnyvale, CA (US); Yen-Son Paul Huang, Los Altos Hills, CA (US)

(73) Assignee: FORTEMEDIA, INC., Santa Clara, CA (US)

( * ) Notice: Subject to any disclaimer, the term of this patent is extended or adjusted under 35 U.S.C. 154(b) by 20 days.

(21) Appl. No.: 15/418,855

(22) Filed: Jan. 30, 2017

(65) Prior Publication Data

US 2017/0272858 A1    Sep. 21, 2017

Related U.S. Application Data

(60) Provisional application No. 62/310,878, filed on Mar. 21, 2016.

(51) Int. Cl.
| | |
|---|---|
| *H04R 29/00* | (2006.01) |
| *H04R 3/04* | (2006.01) |
| *G10L 25/51* | (2013.01) |
| *H04R 1/04* | (2006.01) |
| *H04W 52/02* | (2009.01) |

(52) U.S. Cl.
CPC .............. *H04R 3/04* (2013.01); *G10L 25/51* (2013.01); *H04R 29/004* (2013.01); *H04R 1/04* (2013.01); *H04R 2499/11* (2013.01); *H04W 52/02* (2013.01)

(58) Field of Classification Search
CPC ..................................................... H04R 29/00
See application file for complete search history.

(56) References Cited

U.S. PATENT DOCUMENTS 9,741,333 B2 * 8/2017 Kumar ................. G10K 11/178
2016/0105155 A1 * 4/2016 Thomas ................... H03G 3/32
381/57

(Continued)

*Primary Examiner* — Olisa Anwah
(74) *Attorney, Agent, or Firm* — McClure, Qualey & Rodack, LLP

(57) ABSTRACT

An acoustic capture device includes an acoustic transducer, an acoustic detector, an analog-to-digital converter, and a processing element. The acoustic transducer captures an acoustic wave to generate an analog signal. The acoustic detector detects, according to the analog signal, a specific event to generate a trigger signal. The analog-to-digital converter converts the analog signal to generate a digital signal. The processing element receives the trigger signal to execute a control process. The control process includes: analyzing the digital signal to determine ambient information; determining a first set of parameters of the acoustic detector according to the ambient information; performing a control information protocol to adjust the acoustic detector according to the first set of parameters; and performing, according to the ambient information, an enhancement processing on the digital signal to generate an enhanced digital signal.

20 Claims, 2 Drawing Sheets

(56) References Cited

U.S. PATENT DOCUMENTS

2016/0125869 A1* 5/2016 Kulavik ............... G10K 11/178
                                              381/71.6
2016/0336913 A1* 11/2016 Kuruba Buchannagari ................
                                              H03G 3/32
2017/0090865 A1* 3/2017 Armstrong-Muntner ....................
                                              H04R 29/001
2017/0316117 A1* 11/2017 Voncken ............. G06F 17/5004

* cited by examiner

ACOUSTIC CAPTURE DEVICES AND METHODS THEREOF

CROSS REFERENCE TO RELATED APPLICATIONS

This application claims the benefit of U.S. Provisional Application No. 62/310,878, filed on Mar. 21, 2016, the entirety of which is incorporated by reference herein.

BACKGROUND OF THE INVENTION

Field of the Invention

The disclosure relates generally to methods and devices for capturing acoustic wave, and more particularly it relates to methods and devices for interactive control of acoustic transducers.

Description of the Related Art

Since the battery power of most portable devices is limited, there is a need to activate and deactivate some power-consuming components of these portable devices in order to prolong battery life. The power-consuming components may include, for example, ADC's, processing components, and the host systems of the portable devices. Acoustic transducers with an acoustic detector provide a low-cost means to determine the activation of the power-consuming components based on the detection of a predetermined event.

The acoustic detector is configurable via a set of parameters including, for example, cutoff frequency, threshold, and transfer function gain. However, the optimal set of parameters may vary with various environments for an optimal balance between power consumption and performance. Therefore, we need methods and devices to obtain an optimal balance between power consumption and performance.

BRIEF SUMMARY OF THE INVENTION

In an embodiment, an acoustic capture device comprises: an acoustic transducer, an acoustic detector, an analog-to-digital converter, and a processing element. The acoustic transducer captures an acoustic wave to generate an analog signal. The acoustic detector detects, according to the analog signal, a specific event to generate a trigger signal. The analog-to-digital converter converts the analog signal to generate a digital signal. The processing element, receives the trigger signal to execute a control process. The control process comprises: analyzing the digital signal to determine ambient information; determining a first set of parameters of the acoustic detector according to the ambient information; performing a control information protocol to adjust the acoustic detector according to the first set of parameters; and performing, according to the ambient information, an enhancement processing on the digital signal to generate an enhanced digital signal.

According to an embodiment of the invention, the acoustic wave is in a frequency range which comprises a human-audible frequency range and a human-inaudible frequency range.

According to an embodiment of the invention, the specific event comprises a voice, speech, and ultrasound. The acoustic detector generates the trigger signal when at least one of the voice, the speech, and the ultrasound is detected.

According to an embodiment of the invention, the control process further comprises: determining a second set of parameters of the acoustic transducer according to the ambient information; and performing the control information protocol to adjust the acoustic transducer according to the second set of parameters.

According to an embodiment of the invention, the control process further comprises: determining a third set of parameters of the analog-to-digital converter according to the ambient information; and performing the control information protocol to adjust the analog-to-digital converter according to the third set of parameters.

According to an embodiment of the invention, the first set of parameters comprises a cutoff frequency, a detecting threshold, and a transfer function of the acoustic detector. The second set of parameters comprises a frequency response, an output dynamic range, sensitivity and a noise floor of the acoustic transducer. The third set of parameters comprises a frequency response, sensitivity, an input dynamic range, an output bit resolution, and an output noise floor of the analog-to-digital converter.

According to an embodiment of the invention, the processing element performs the control information protocol to ensure an optimal balance between power consumption and performance of the acoustic capture device.

According to an embodiment of the invention, the step of analyzing the digital signal to determine the ambient information comprises: analyzing the digital signal to determine the ambient information about where the acoustic transducer is located; and determining an environment condition about where the acoustic transducer is located according to the ambient information. The environment condition comprises a quiet environment, a normal environment, a noisy environment, and a babble environment. The steps of determining the first set of parameters of the acoustic detector according to the ambient information, determining the second set of parameters of the acoustic transducer according to the ambient information, and determining the third set of parameters of the analog-to-digital converter according to the ambient information further comprise: consulting a look-up table to determine the first set, the second set, and the third set of parameters according to the environment condition.

According to an embodiment of the invention, the enhancement processing comprises at least one of acoustic echo cancellation, noise suppression, microphone array beamforming, and intelligent acoustic equalizations.

According to an embodiment of the invention, the control process further comprises: performing a data transport protocol to provide the ambient information and the enhanced digital signal to a host.

In an embodiment, a method for controlling an acoustic capture device comprising an acoustic transducer, an acoustic detector, and an analog-to-digital converter, comprises: using the acoustic transducer to capture an acoustic wave to generate an analog signal; using the acoustic detector to detect, according to the analog signal, a specific event to generate a trigger signal; using the analog-to-digital converter to convert the analog signal to generate a digital signal; and executing a control process in response to the trigger signal. The control process comprises: analyzing the digital signal to determine ambient information; determining a first set of parameters of the acoustic detector according to the ambient information; performing a control information protocol to adjust the acoustic detector according to the first set of parameters; and performing, according to the ambient information, an enhancement processing on the digital signal to generate an enhanced digital signal.

According to an embodiment of the invention, the acoustic wave is in a frequency range which comprises a human-audible frequency range and a human-inaudible frequency range.

According to an embodiment of the invention, the specific event comprises a voice, speech, and ultrasound, in which the acoustic detector generates the trigger signal when at least one of the voice, the speech, and the ultrasound is detected.

According to an embodiment of the invention, the control process further comprises: determining a second set of parameters of the acoustic transducer according to the ambient information; and performing the control information protocol to adjust the acoustic transducer according to the second set of parameters.

According to an embodiment of the invention, the control process further comprises: determining a third set of parameters of the analog-to-digital converter according to the ambient information; and performing the control information protocol to adjust the analog-to-digital converter according to the third set of parameters.

According to an embodiment of the invention, the first set of parameters comprises a cutoff frequency, a detecting threshold, and a transfer function of the acoustic detector. The second set of parameters comprises a frequency response, an output dynamic range, sensitivity and a noise floor of the acoustic transducer. The third set of parameters comprises a frequency response, sensitivity, an input dynamic range, an output bit resolution, and an output noise floor of the analog-to-digital converter.

According to an embodiment of the invention, the control information protocol is performed to ensure an optimal balance between power consumption and performance of the acoustic capture device.

According to an embodiment of the invention, the step of analyzing the digital signal to determine the ambient information comprises: analyzing the digital signal to determine the ambient information about where the acoustic transducer is located; and determining an environment condition about where the acoustic transducer is located according to the ambient information. The environment condition comprises a quiet environment, a normal environment, a noisy environment, and a babble environment. The steps of determining the first set of parameters of the acoustic detector according to the ambient information, determining the second set of parameters of the acoustic transducer according to the ambient information, and determining the third set of parameters of the analog-to-digital converter according to the ambient information further comprise: consulting a look-up table to determine the first set, the second set, and the third set of parameters according to the environment condition.

According to an embodiment of the invention, the enhancement processing comprises at least one of acoustic echo cancellation, noise suppression, microphone array beamforming, and intelligent acoustic equalizations.

According to an embodiment of the invention, the control process further comprises: performing a data transport protocol to provide the ambient information and the enhanced digital signal to a host.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
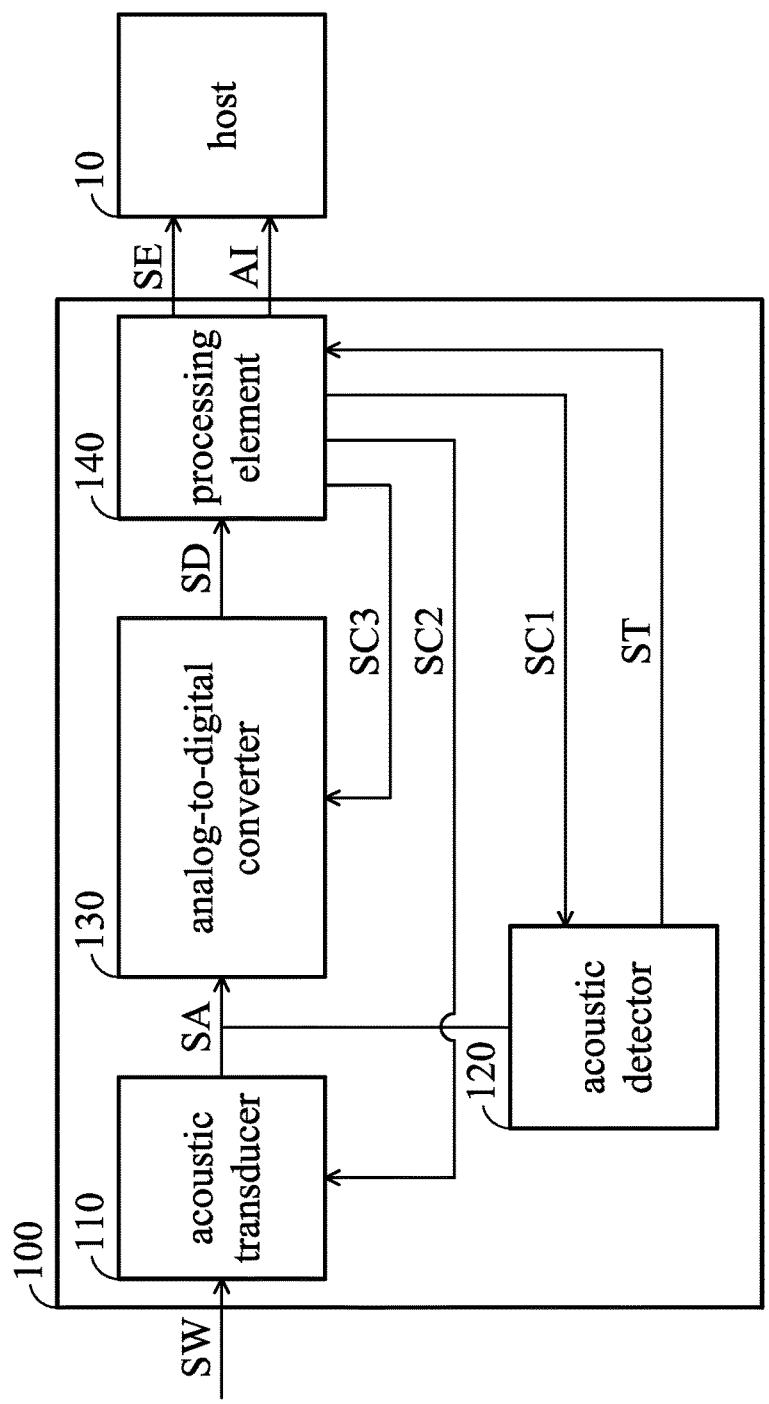
FIG. 1 is a block diagram of an acoustic capture device in accordance with an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a block diagram of an acoustic capture device in accordance with an embodiment of the invention. As shown in FIG. 1, the acoustic capture device 100 includes an acoustic transducer 110, an acoustic detector 120, an analog-to-digital converter 130, and a processing element 140. According to other embodiments of the invention, the acoustic capture device 100 may include a plurality of the acoustic transducers, a plurality of the acoustic detectors, a plurality of the analog-to-digital converters, and a plurality of processing elements, in which the acoustic capture device 100 illustrated herein is only used for illustration, but not limited thereto.

The acoustic transducer 110 is configured to capture an acoustic wave SW to generate an analog signal SA. According to an embodiment of the invention, the acoustic wave SW is in a frequency range, in which the frequency range includes a human-audible frequency range and a human-inaudible frequency range. According to an embodiment of the invention, the human-inaudible frequency range includes ultrasound. According to an embodiment of the invention, the analog signal SA is an electrical signal. According to another embedment of the invention, the analog signal SA includes the right channel and the left channel of electrical signal. According to yet another embedment of the invention, the analog signal SA includes at least one channel of electrical signal.

According to an embodiment of the invention, the acoustic detector 120 detects a specific event according to the analog signal SA to generate a trigger signal ST. According to another embodiment of the invention, the acoustic detector 120 detects a specific event from the analog signal SA. Once a specific event is detected, the acoustic detector 120 generates the trigger signal ST to activate the processing element 140. According to an embodiment of the invention, the specific event includes a voice, speech, and ultrasound. When at least one of a voice, speech, and ultrasound is detected from the analog signal SA, the acoustic detector 120 generates the trigger signal ST to activate the processing element 140.

The analog-to-digital converter 130 converts the analog signal SA to generate a digital signal SD. According to an embodiment of the invention, when the acoustic capture device 100 includes a plurality of acoustic transducers 110 and a plurality of analog-to-digital converters 130, each of the analog-to-digital converters 130 converts each individual analog signal SA generated by each of the acoustic transducers 110.

The processing element 140 receives the trigger signal ST to execute a control process CP. In other words, once the trigger signal ST is generated, the processing element 140 executes the control process. According to an embodiment of the invention, the processing element 140 may be a RISC or DSP processor. According to another embodiment of the invention, the processing element 140 could be any type of processor which is known or in development.

Figure 2:
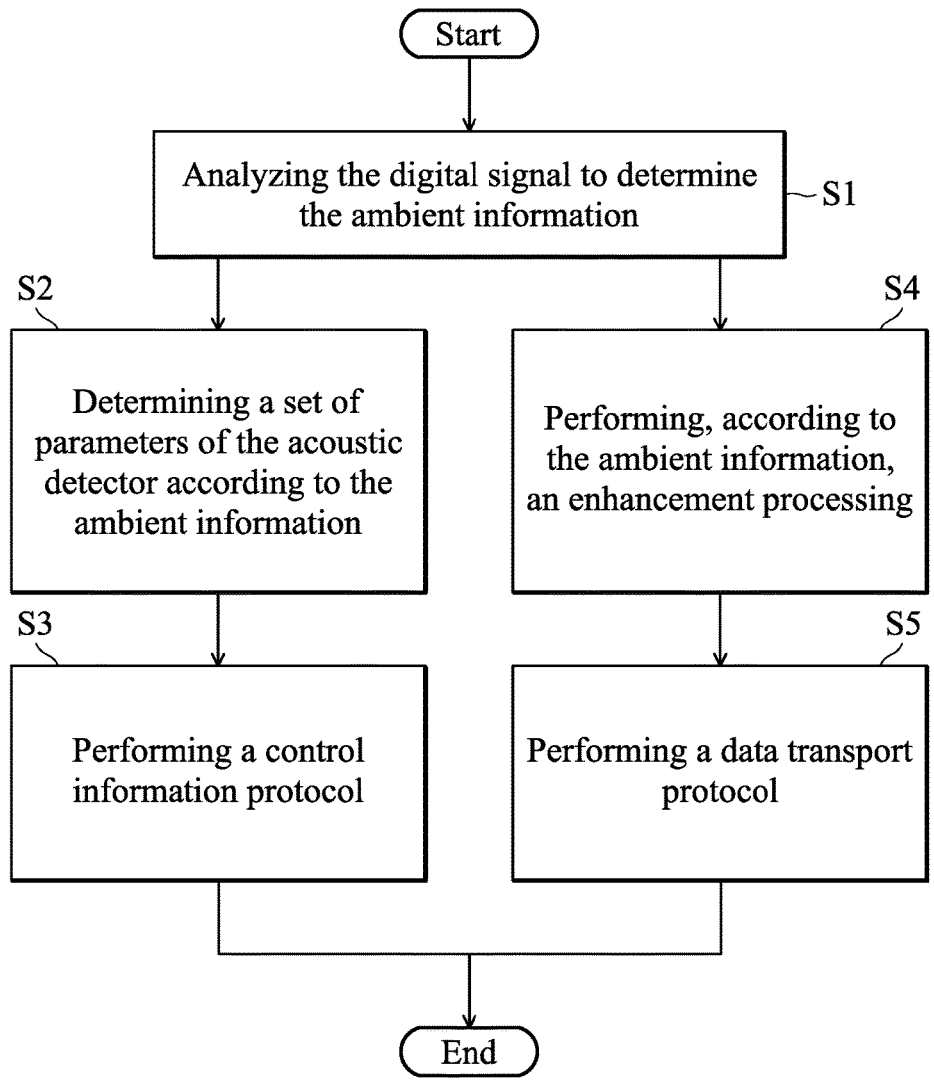
FIG. 2 is a flow chart of a control process in accordance with an embodiment of the invention.

FIG. 2 is a flow chart of a control process in accordance with an embodiment of the invention. As shown in FIG. 2, the processing element 140 analyzes the digital signal SD to determine the ambient information AI when the trigger signal ST is received (Step S1). According to an embodiment of the invention, the ambient information AI indicates where the acoustic capture device 100 is located. According to an embodiment of the invention, the processing element 140 performs the acoustic scene analysis and the classification algorithm to determine where the acoustic capture device 100 is located according to the ambient information AI. According to an embodiment of the invention, the classification algorithm includes either a Statistical Classifier, or a Neural Network based, or a hybrid algorithm comprised of Statistical Classifier, Neural Network Classifier, and associated Decision Logic.

According to an embodiment of the invention, when the ambient information AI is determined, the processing element 140 determines a set of parameters SC1 of the acoustic detector 120 according to the ambient information AI (Step S2), for the optimal balance of power consumptions and performance. According to an embodiment of the invention, the set of parameters SC1 of the acoustic detector 120 includes, for example, a cutoff frequency, a detecting threshold, and a transfer function of the acoustic detector 120.

According to another embodiment of the invention, the processing element 140 also determines a set of parameters SC2 of the acoustic transducer 110 according to the ambient information AI. According to yet another embodiment of the invention, the processing element 140 also determines a set of parameters SC3 of the analog-to-digital converter 130 according to the ambient information AI.

According to an embodiment of the invention, the set of parameters SC2 of the acoustic transducer 110 includes, for example, a frequency response, an output dynamic range, sensitivity, and a noise floor of the acoustic transducer 110. According to an embodiment of the invention, the set of parameters SC3 of the analog-to-digital converter 130 includes, for example, a frequency response, sensitivity, an input dynamic range, an output bit resolution, and an output noise floor of the analog-to-digital converter 130.

According to other embodiments of the invention, in Step S1, the processing element 140 analyzes the digital signal SD to determine the ambient information AI about where the acoustic transducer 110 is located. When the ambient information AI is determined, the processing element 140 determines an environment condition about where the acoustic transducer 110 is located according to the ambient information AI. According to an embodiment of the invention, the environment condition is fitted into a predetermined environment condition which includes, but is not limited to, a quiet environment, a normal environment, a noisy environment, and a babble environment.

According to other embodiments of the invention, in Step S2, once the environment condition is determined, the processing element 140 consults a look-up table to determine the parameters SC1, SC2, and SC3 of the acoustic detector 120, the acoustic transducer 110, and the analog-to-digital converter 130 according to the environment condition.

Back to Step S2, when the parameters are determined, the processing element 140 performs a control information protocol (Step S3). According to an embodiment of the invention, the processing element 140 performs the control information protocol to adjust the acoustic detector 120 according to the set of parameters of the acoustic detector 120 when the set of parameters of the acoustic detector 120 is determined.

According to another embodiment of the invention, the processing element 140 performs the control information protocol to adjust the acoustic transducer 110 according to the set of parameters of the acoustic transducer 110 when the set of parameters of the acoustic transducer 110 is determined. According to yet another embodiment of the invention, the processing element 140 performs the control information protocol to adjust the analog-to-digital converter 130 according to the set of parameters of the analog-to-digital converter 130 when the set of parameters of the analog-to-digital converter 130 is determined.

When the control information protocol is performed, the acoustic capture device 100 is more adaptive to the environment condition about where the acoustic capture device 100 is located since the acoustic capture device 100 is adjusted according to the ambient information AI.

Back to Step S1, when the ambient information AI is determined, the processing element 140 performs, according to the ambient information AI, an enhancement processing on the digital signal SD to generate an enhanced digital signal SE (Step S4), in order to provide data for better communication and/or identification. According to an embodiment of the invention, the enhancement processing includes at least one of acoustic echo cancellation, noise suppression, microphone array beamforming, and intelligent acoustic equalizations. According to other embodiments of the invention, the enhancement processing could be any known or developing process which is configured to improve communication and/or identification.

When the enhancement processing is performed, the processing element 140 performs a data transport protocol to provide the ambient information AI and the enhanced digital signal SE to the host 10 (Step S5), for better communication and/or identification. According to an embodiment of the invention, the processing element 140 also provides the ambient information AI to the host 10 for further usage or data fusion applications.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An acoustic capture device, comprising:
    an acoustic transducer, capturing an acoustic wave to generate an analog signal;
    an acoustic detector, detecting, according to the analog signal, a specific event to generate a trigger signal;
    an analog-to-digital converter, converting the analog signal to generate a digital signal; and
    a processing element, receiving the trigger signal to execute a control process, wherein the control process comprises:
    analyzing the digital signal to determine ambient information;
    determining a first set of parameters of the acoustic detector according to the ambient information;
    performing a control information protocol to adjust the acoustic detector according to the first set of parameters; and
    performing, according to the ambient information, an enhancement processing on the digital signal to generate an enhanced digital signal.

2. The acoustic capture device of claim 1, wherein the acoustic wave is in a frequency range, wherein the frequency range comprises a human-audible frequency range and a human-inaudible frequency range.

3. The acoustic capture device of claim 1, wherein the specific event comprises a voice, speech, and ultrasound, wherein the acoustic detector generates the trigger signal when at least one of the voice, the speech, and the ultrasound is detected.

4. The acoustic capture device of claim 1, wherein the control process further comprises:
    determining a second set of parameters of the acoustic transducer according to the ambient information; and
    performing the control information protocol to adjust the acoustic transducer according to the second set of parameters.

5. The acoustic capture device of claim 4, wherein the control process further comprises:
    determining a third set of parameters of the analog-to-digital converter according to the ambient information; and
    performing the control information protocol to adjust the analog-to-digital converter according to the third set of parameters.

6. The acoustic capture device of claim 5, wherein the first set of parameters comprises a cutoff frequency, a detecting threshold, and a transfer function of the acoustic detector, wherein the second set of parameters comprises a frequency response, an output dynamic range, sensitivity and a noise floor of the acoustic transducer, wherein the third set of parameters comprises a frequency response, sensitivity, an input dynamic range, an output bit resolution, and an output noise floor of the analog-to-digital converter.

7. The acoustic capture device of claim 5, wherein the processing element performs the control information protocol to ensure an optimal balance between power consumption and performance of the acoustic capture device.

8. The acoustic capture device of claim 5, wherein the step of analyzing the digital signal to determine the ambient information comprises:
    analyzing the digital signal to determine the ambient information about where the acoustic transducer is located; and
    determining an environment condition about where the acoustic transducer is located according to the ambient information, wherein the environment condition comprises a quiet environment, a normal environment, a noisy environment, and a babble environment;
    wherein the steps of determining the first set of parameters of the acoustic detector according to the ambient information, determining the second set of parameters of the acoustic transducer according to the ambient information, and determining the third set of parameters of the analog-to-digital converter according to the ambient information further comprise:
    consulting a look-up table to determine the first set, the second set, and the third set of parameters according to the environment condition.

9. The acoustic capture device of claim 1, wherein the enhancement processing comprises at least one of acoustic echo cancellation, noise suppression, microphone array beamforming, and intelligent acoustic equalizations.

10. The acoustic capture device of claim 1, wherein the control process further comprises:
    performing a data transport protocol to provide the ambient information and the enhanced digital signal to a host.

11. A method for controlling an acoustic capture device comprising an acoustic transducer, an acoustic detector, and an analog-to-digital converter, comprising:
    by the acoustic transducer, capturing an acoustic wave to generate an analog signal;
    using the acoustic detector to detect, according to the analog signal, a specific event to generate a trigger signal;
    using the analog-to-digital converter to convert the analog signal to generate a digital signal;
    executing a control process in response to the trigger signal, wherein the control process comprises:
    analyzing the digital signal to determine ambient information;
    determining a first set of parameters of the acoustic detector according to the ambient information;
    performing a control information protocol to adjust the acoustic detector according to the first set of parameters; and
    performing, according to the ambient information, an enhancement processing on the digital signal to generate an enhanced digital signal.

12. The method of claim 11, wherein the acoustic wave is in a frequency range, wherein the frequency range comprises a human-audible frequency range and a human-inaudible frequency range.

13. The method of claim 11, wherein the specific event comprises a voice, speech, and ultrasound, wherein the acoustic detector generates the trigger signal when at least one of the voice, the speech, and the ultrasound is detected.

14. The method of claim 11, wherein the control process further comprises:
    determining a second set of parameters of the acoustic transducer according to the ambient information; and
    performing the control information protocol to adjust the acoustic transducer according to the second set of parameters.

15. The method of claim 14, wherein the control process further comprises:
    determining a third set of parameters of the analog-to-digital converter according to the ambient information; and performing the control information protocol to adjust the analog-to-digital converter according to the third set of parameters.

16. The method of claim 15, wherein the first set of parameters comprises a cutoff frequency, a detecting threshold, and a transfer function of the acoustic detector, wherein the second set of parameters comprises a frequency response, an output dynamic range, sensitivity and a noise floor of the acoustic transducer, wherein the third set of parameters comprises a frequency response, sensitivity, an input dynamic range, an output bit resolution, and an output noise floor of the analog-to-digital converter.

17. The method of claim 15, wherein the control information protocol is performed to ensure an optimal balance between power consumption and performance of the acoustic capture device.

18. The method of claim 15, wherein the step of analyzing the digital signal to determine the ambient information comprises:
   analyzing the digital signal to determine the ambient information about where the acoustic transducer is located; and
   determining an environment condition about where the acoustic transducer is located according to the ambient information, wherein the environment condition comprises a quiet environment, a normal environment, a noisy environment, and a babble environment;
   wherein the steps of determining the first set of parameters of the acoustic detector according to the ambient information, determining the second set of parameters of the acoustic transducer according to the ambient information, and determining the third set of parameters of the analog-to-digital converter according to the ambient information further comprise:
   consulting a look-up table to determine the first set, the second set, and the third set of parameters according to the environment condition.

19. The method of claim 11, wherein the enhancement processing comprises at least one of acoustic echo cancellation, noise suppression, microphone array beamforming, and intelligent acoustic equalizations.

20. The method of claim 11, wherein the control process further comprises:
   performing a data transport protocol to provide the ambient information and the enhanced digital signal to a host.

* * * * *